United States Patent Office 2,820,027
Patented Jan. 14, 1958

2,820,027

POLYMERIZATION OF TRIFLUOROCHLORO-
ETHYLENE

William E. Hanford, Short Hills, N. J., assignor, by mesne assignments, to Minnesota Mining and Manufacturing Company, St. Paul, Minn., a corporation of Delaware No Drawing. Application September 7, 1954
Serial No. 454,622

2 Claims. (Cl. 260—92.1)

This invention relates to the manufacture of perhalocarbons, and as herein employed, a perhalocarbon is defined as a compound consisting substantially of carbon and halogen and possessing any degree of saturation. A fluorochloroolefin is therefore defined as a perhalocarbon, as is also a perhaloolefin, having any degree of unsaturation and consisting of fluorine, chlorine, and carbon and having not more than one chlorine atom per carbon atom. More particularly, this invention relates to the polymerization of triflurochloroethylene to produce a normally solid polymer of high chemical and physical stability.

Under suitable reaction conditions trifluorochloroethylene can be polymerized to produce a normally solid polymer or plastic of good physical and chemical properties, suitable for molding into articles of manufacture. Polymerization of trifluorochloroethylene to produce solid polymers is effected in a batch manner in a bomb type reaction vessel. The monomer is introduced into the bomb together with a suitable promoter and polymerization is effected therein at a temperature of about —16° C. for a period of about seven days. The monomer in the bomb is converted to a porous plug of solid polymer with approximately 33 percent yield of polymer, based on the monomer charged. Unreacted monomer is occluded in the interstices of the porous plug and is removed therefrom by heating the reaction vessel to evaporate the monomer from the solid polymer plug. After the monomer has been evaporated from the polymer plug, the plug is removed from the reaction vessel, broken into chips or granules, and then molded for the desired purpose.

The apparatus currently employed to effect the process described above is a cylindrical vessel or bomb, approximately 6 inches in inside diameter, surrounded by a cooling liquid. Because of the poor heat transfer of the polymer, it is necessary to maintain the cooling bath and thereby the reaction vessel at a temperature materially below the optimum polymerization temperature to avoid overheating of the reactants and polymer in the center of the reaction vessel. Experiments in vessels of smaller diameter have indicated that the temperature can be increased and hence the average temperature of the material, without increase in the maximum temperature of the material at the center of the vessel. An increase in the average temperature of polymerization increases the rate of polymerization and results generally in a shorter period of time to obtain an economic yield of solid polymer product. There is also an indication that the quality of the solid polymer produced at the higher temperatures and with the smaller vessels is improved as the result of the greater uniformity of temperature characterized by these smaller vessels. However, reduction in the diameter of the reaction vessel or bomb reduces the amount of material which can be produced for a given charge since the length of the vessel must be limited to enable easy removal of the solid polymer plug. It is, therefore, much to be desired to provide a method for overcoming the above-noted inherent difficulties of heat transfer in the production of normally solid polymers of trifluorochloroethylene.

In accordance with the present invention, a perfluorochloroolefin, particularly trifluorochloroethylene, is polymerized in the presence of a liquid diluent which may be a polyhalogenated acyclic compound having a boiling point of at least 20° C. or a perhalogenated cycloalkenyl compound or an aryl substituted perhalogenated methane. The diluent must be one which does not have a detrimental effect upon the desired polymerization reaction, and preferably the diluent is substantially inert and nonreactive, although the use of a diluent which enters into the reaction or acts as a promoter is not excluded. Particularly suitable diluents, are polyhalogenated acyclic compounds, such as trichloromonofluoromethane; perfluorinated carboxylic acids and amines, such as perfluoropropionic acid and perfluorotributylamine; polyhalogenated unsaturated acyclic compounds, such as 2,3-dichlorohexafluorobutene-2, polyhalogenated saturated alkanes, such as 1,1-difluoro-1,2-dichloroethane; and various cotelomer oils, such as that produced by cotelomerizing trifluorochloroethylene with 1,1-difluoroethylene.

The diluent is employed in a weight ratio of liquid diluent to liquid monomer charged of about 90 to 1 to about 0.4 to 1, preferably from about 10 to 1 to about 1 to 1. The reaction temperature may be in the range of about —20° C. to about 90° C. and is preferably in the range of about —20° C. to +30° C. The time of reaction may desirably be between 5 and 168 hours while the reaction presure may be autogenous, i. e., about 75 p. s. i. g., or the system may be pressured as high as 500 p. s. i. g., if desired.

In the polymerization of trifluorochloroethylene to produce normally solid polymers, various organic peroxides may be used as promoters and are preferably first dissolved in a solvent to facilitate handling and mixing in the reaction zone. Among the organic peroxides which may be used are bis-trichloroacetyl peroxide, trifluoroacetyl peroxide, difluorochloroacetyl peroxide, benzoyl peroxide, chloroacetyl peroxide, and dichlorofluoroacetyl peroxide. Bis-trichloroacetyl peroxide is a preferred promoter. Among the solvents which may be employed for dissolving the organic peroxide promoters are trichlorofluoromethane, difluorodichloromethane, trichlorotrifluoroethane, dichloroperfluorocyclobutane, and perfluoroheptane.

The peroxide promoter, such as bis-trichloroacetyl peroxide, is normally employed in a quantity corresponding to about 0.01 to 2 percent by weight of the monomer charged.

It may be desirable to cool the reaction vessel by indirect heat exchange and in such circumstances the vessel may be surrounded by a heat transfer medium. Also, a conventional cooling coil may be employed, which may be immersed in the reaction mixture or may surround the reaction vessel.

Nitrogen or other inert gas may be used to pressure the system by injecting a stream of the gas into the vapor space of the reaction vessel.

After recovery of the normally solid polymer, the polymer may be further treated by fluorination or pyrolysis, for example, or by other means known to the art.

The term polymerization as employed herein includes copolymerization of perhaloolefins, i. e., the preferred monomer trifluorochloroethylene may be polymerized with other olefins known to the art, which possess the ability to polymerize, or perhaloolefins other than trifluorochloroethylene may be copolymerized with dissimilar olefins in accordance with the process of the invention.

The invention will be further illustrated by reference to the following specific example:

*Polymerization of CF₂=CFCl in the presence of diluents at +5° C. for 20 hours using bis-trichloroacetyl peroxide as promoter*

| Tube No. | Parts CF₂=CFCl | Parts diluent | Percent cat. | Percent yield | 0.75% [1] solution viscosity (centistokes) |
|---|---|---|---|---|---|
| 1 | 50 | 50 CCl₃F | 1.0 | 21.6 | 0.456 |
| 2 | 50 | 50 3,5-dichlorobenzotrifluoride | 1.0 | 20.8 | 0.480 |
| 3 | 50 | 50 m-chlorobenzotrifluoride | 1.0 | 19.6 | 0.471 |
| 4 | 50 | 50 CH₂Cl-CF₂Cl | 1.0 | 14.0 | 0.445 |
| 5 | 50 | 50 p-chlorobenzotrifluoride | 1.0 | 19.5 | 0.480 |
| 6 | 50 | 50 perfluoropropionic acid | 1.0 | 12.8 | 0.513 |
| 7 | 50 | 50 CF₂=CFCl/CH₂=CF₂ cotelomer oil [2] | 1.0 | 21.6 | 0.493 |
| 8 | 50 | 50 bis-(trifluoromethyl) benzene | 1.0 | 20.8 | 0.472 |
| 9 | 50 | 50 hexafluorodichlorocyclopentene | 1.0 | 23.2 | 0.484 |
| 10 | 50 | 50 2,3-dichlorohexafluorobutene | 1.0 | 26.0 | 0.486 |
| 11 | 50 | 50 perfluorotributylamine | 1.0 | 32.4 | 0.552 |

[1] In 3, 5-dichlorobenzotrifluoride solvent.
[2] B.P. 112–114°C.

EXAMPLE 1

Each of 11 heavy walled polymerization tubes was flushed with nitrogen several times by alternately evacuating and filling with gaseous nitrogen on a suitable manifold system. After immersing the tubes in a liquid nitrogen bath, the tubes were charged with trichloroacetyl peroxide dissolved in trichloromonofluoromethane. After cautiously evaporating the trichloromonofluoromethane in vacuo, the diluents were added to the tubes. The tubes were then removed from the freezing bath, connected to a manifold system, quickly evacuated, and further cooled by replacing them in a liquid nitrogen bath. A measured amount of chlorotrifluoroethylene was then distilled into the evacuated polymerization tubes and the tubes were then sealed while still frozen in liquid nitrogen. Each polymerization tube was shaken at a temperature of +5° C., and at the end of 20 hours, the tubes were vented to atmospheric pressure and opened. After evaporating the solvent, the polymer was collected, washed thoroughly with water, and dried to constant weight at 190° C.

The results of these experiments are as follows:

For the purpose of the present invention a polymer which has as 0.75 percent solution viscosity, in a 3,5-dichlorobenzotrifluoride solvent, of 0.400 centistoke is considered satisfactory.

It will be obvious to those skilled in the art that many modifications may be made within the scope of the present invention without departing from the spirit thereof, and the invention includes all such modifications.

I claim:

1. A process for polymerizing trifluorochloroethylene monomer which comprises polymerizing the monomer in the presence of an organic peroxide promoter and at least about 40 percent by weight, based upon the weight of monomer charged, of a perfluorinated tertiary alkyl amine.

2. A process according to claim 1 in which the diluent is perfluorotributylamine.

References Cited in the file of this patent

UNITED STATES PATENTS

| 2,600,804 | Rearick | June 17, 1952 |
| 2,600,821 | Wrightson | June 17, 1952 |
| 2,700,662 | Young et al. | Jan. 25, 1955 |
| 2,705,706 | Dittman et al. | Apr. 5, 1955 |